June 24, 1947.  C. D. SCHURTER  2,422,988
DIRECTION SIGNAL FOR VEHICLES
Filed March 12, 1945  3 Sheets-Sheet 1

C. D. Schurter
INVENTOR.

BY *Knowles*
ATTORNEYS.

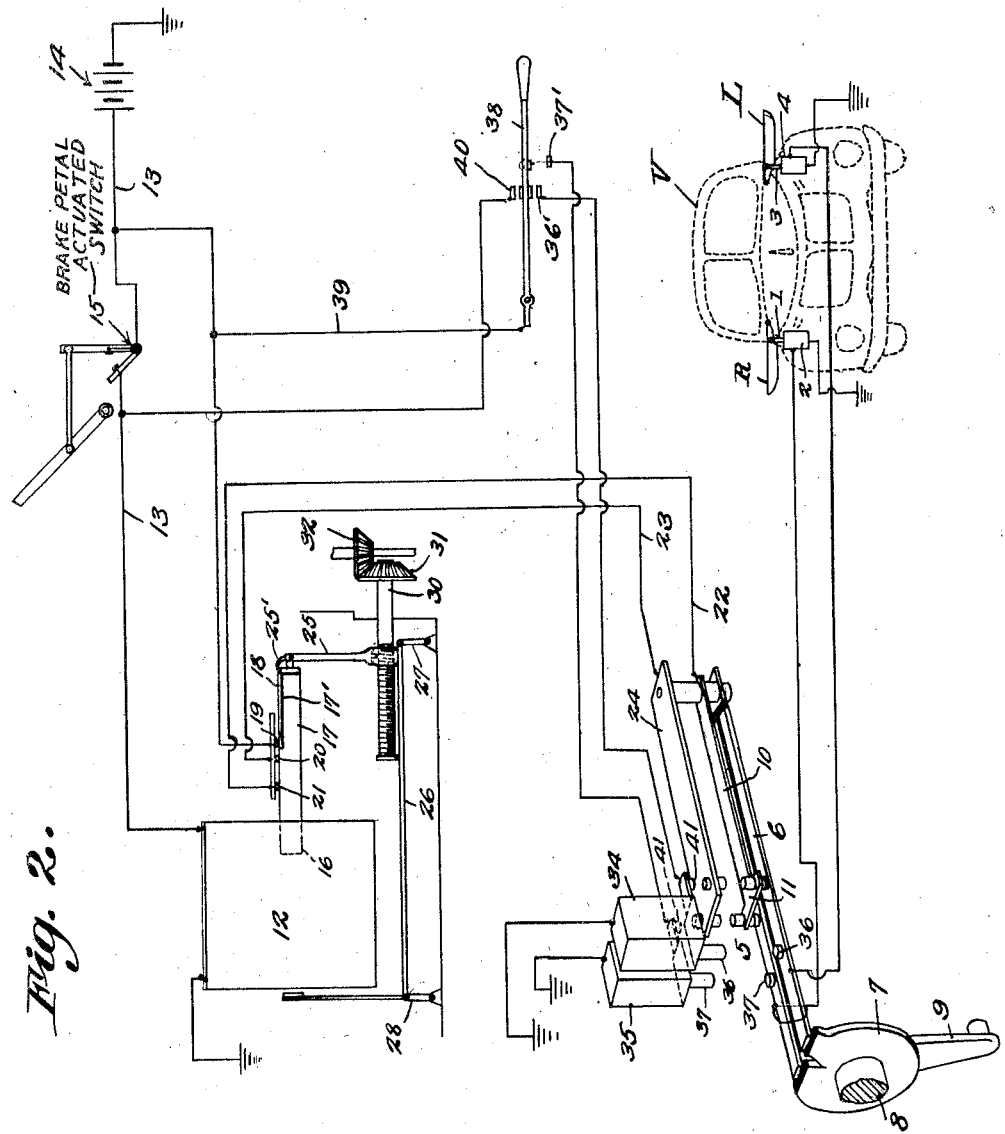

June 24, 1947.  C. D. SCHURTER  2,422,988
DIRECTION SIGNAL FOR VEHICLES
Filed March 12, 1945  3 Sheets-Sheet 3

C. D. Schurter
INVENTOR.

BY
ATTORNEYS.

Patented June 24, 1947

2,422,988

UNITED STATES PATENT OFFICE 2,422,988

DIRECTION SIGNAL FOR VEHICLES

Cornelius Dunham Schurter, Long Beach, Calif.

Application March 12, 1945, Serial No. 582,349

5 Claims. (Cl. 177—329)

This invention relates to direction signals designed primarily for use in connection with motor vehicles.

It is of the type utilizing arms or semaphores located at the two sides of the vehicle either or both of which can be brought into position for the purpose of signaling a vehicle approaching from any direction.

The present invention has for an object the provision of a means whereby by the actuation of the usual brake switch both arms or semaphores will be brought immediately to positions indicating "Stop," supplemental means being utilized whereby when the vehicle is about to make a right or a left turn or has started to make such a turn, one of the semaphores will be dropped, leaving the other semaphore in position to indicate the direction in which the turn is to be made.

A still further object is to utilize a means controlled by the movement of the vehicle, for automatically returning either or both semaphores to their initial or inactive positions as soon as the vehicle has traveled a predetermined distance.

With the foregoing and other objects in view which will appear as the description proceeds, the invention consists of certain novel details of construction and combination of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 2 is a view showing, in diagram, the complete apparatus.

Figure 1:
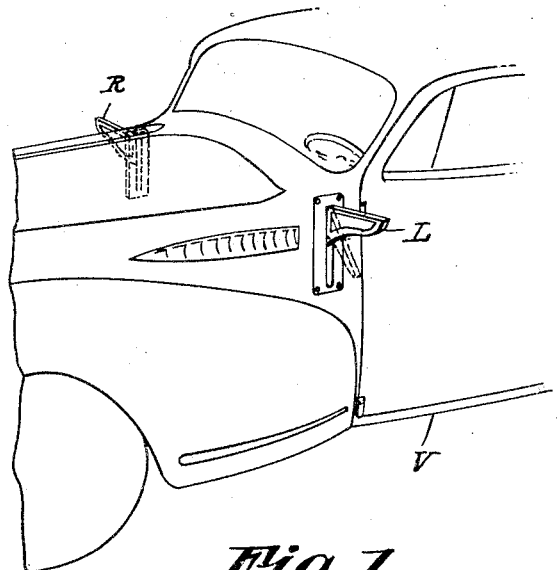
Figure 1 is a perspective view of a portion of a vehicle equipped with the present improvements.
Figure 5:
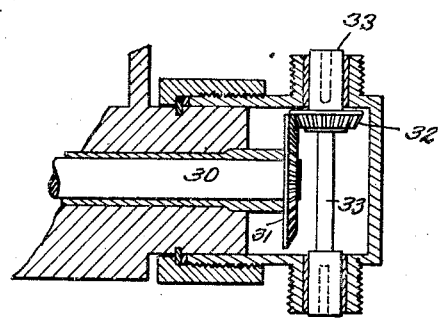
Figure 5 is a view in section illustrating the means for transmitting motion from the speedometer of the vehicle to the core of the master solenoid.
Figure 6:
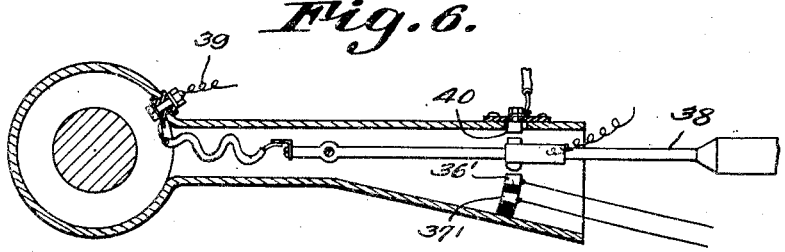
Figure 6 is a view illustrating partly in section and partly in plan the signal control hand lever and cooperating parts.
Figure 3:
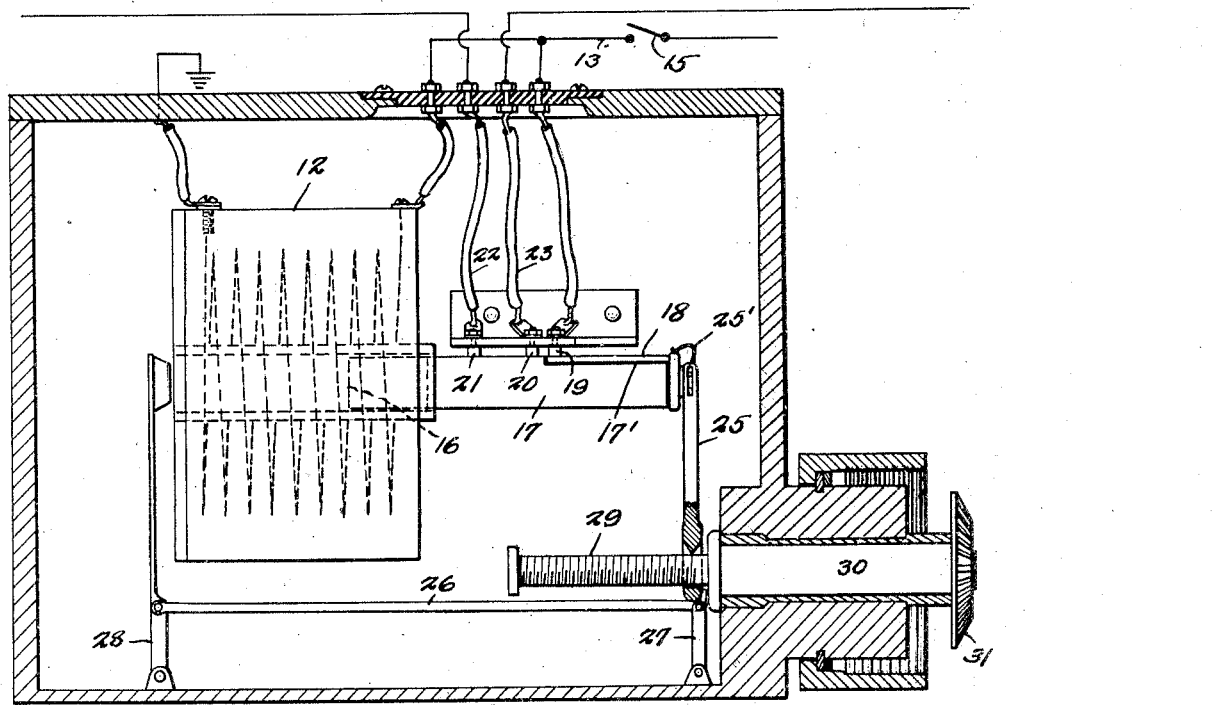
Figure 3 is a vertical longitudinal section through the casing of the master solenoid and illustrating partly in section and partly in elevation the cooperating parts within the casing.
Figure 4:
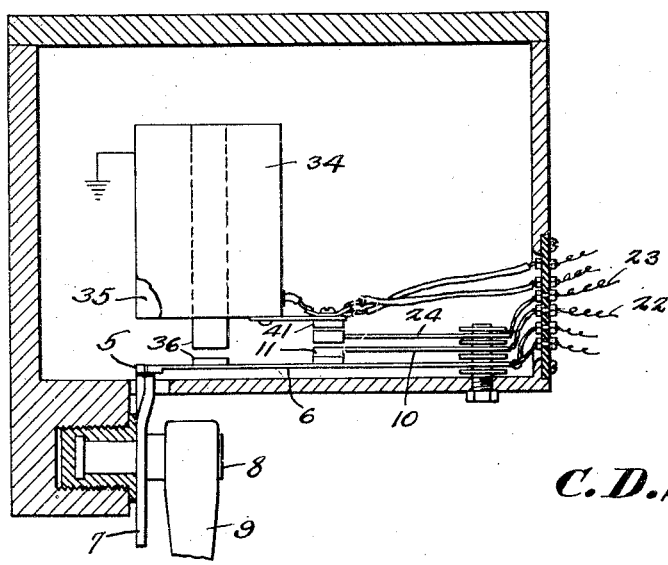
Figure 4 is a section through a casing housing the selective switch, a portion of the means employed for actuating said switch from the steering mechanism being shown.

Referring to the figures by characters of reference, R and L designate semaphores pivotally mounted at the right and left sides respectively of the vehicle V. Each of the semaphores is connected between its ends to the core of a solenoid. The core of the right solenoid has been indicated at 1 and the solenoid has been indicated at 2 while the left core has been shown at 3 and its coil is shown at 4. The parts are so assembled that when the solenoids are de-energized the semaphores are hanging in inactive positions but should either solenoid be energized, its core will actuate the semaphore to which it is connected and move it into active or indicating position.

The control means includes spaced elongated tongues 5 and 6 which are anchored at one end while the other ends normally bear upon but are insulated from a cam 7. This cam is rotatable with a bearing pin 8 extending from and movable with a crank arm 9 adapted to be swung to one side or the other, depending upon the direction of movement of the steering gear. In other words the crank can be attached to and operated by the cross or connecting rod usually employed for transmitting motion between the steering shaft and the front wheels of the vehicle. Thus when the steering mechanism is actuated to turn the vehicle to the right the arm 9 will swing in one direction whereas when a left turn is being made the arm 9 will swing in the opposite direction. Cam 7 is so shaped and positioned that during the left turn this cam will lift the tongue 6 which, as shown, is electrically connected with the solenoid 4 but when the cam is turned in the opposite direction it will lift the tongue 5 which is electrically connected to the solenoid 2.

Another elongated tongue 10 is supported above the tongues 5 and 6 and is anchored at one end. This tongue is provided with a contact 11 extending laterally therefrom and overlying and normally contacting with the two tongues 5 and 6.

In addition to the parts thus far described, there is provided a master solenoid 12 one terminal of which is grounded while the other terminal has a lead 13 extending to one terminal of a battery 14 the other terminal of which is grounded. This lead includes a switch 15 adapted to be closed by the application of the vehicle brake.

The core 16 of the master solenoid includes an extension 17 formed of or provided with an insulating material 17' carrying a contact plate 18. This plate normally engages a stationary contact 19 which is electrically connected to the lead 13 at a point between the switch 15 and the battery 14.

Two additional stationary contacts 20 and 21 are positioned between the solenoid 12 and contact 19 and are located where they can be engaged by plate 18 when the core 16 is shifted away from its normal position, thereby to make an electric connection between contacts 19, 20 and 21. Contact 21 is electrically connected as at 22 to the tongue 10 while contact 20 is electrically connected as at 23, to a supplemental tongue 24 supported adjacent to and normally spaced from the contact 11.

An arm 25 is slidably connected at its upper end to the free end portion of the insulated part 17' of core 16 and is free to slide upwardly and downwardly relative to the core. This arm is also slidably mounted at its lower end on a guide rod 26 pivotally supported by levers 27 and 28 which are parallel. Lever 28 is so positioned that when the core 16 is operated by the master solenoid 12, it will move against one end of said lever and cause it to pull through guide rod 26 upon lever 27. As the levers and rod, in effect, constitute a parallelogram, this movement imparted thereto by the core of the energized master solenoid will be sufficient to allow the lower end of arm 25 to slide downwardly a short distance. This downward movement can be accelerated by a spring 25'. When the arm 25 is thus lowered it engages the thread of a feed screw 29 which is connected to or formed with one end of a shaft 30. This shaft has a gear 31 which is in constant mesh with a gear 32 positioned where it will rotate with the flexible shaft 33 of the speedometer forming a part of the usual equipment of a motor vehicle. Thus while the vehicle is in motion movement will be transmitted through the speedometer shaft to the shaft 30 which, in turn, will operate the screw 29. The screw thread is so pitched that its rotation will result in feeding the dropped arm 25 in one direction, namely, away from the solenoid 12. Thus the arm will act to pull the core 16 with it until the arm 25 reaches the upper end of lever 27 whereupon said lever will be shifted back gradually toward its initial position, at the same time causing rod 26 to gradually lift the arm 25 and ultimately disengage it from the screw 29. Thus the parts become reset and while the screw will continue to rotate, the arm 25 and core 16 will remain inactive.

Normally, as before stated, the semaphores L and R are hanging in inactive positions. When the brake is applied and switch 15 is closed a circuit immediately is established through the master solenoid 12 with the result that core 16 is pulled longitudinally, thereby causing the contact plate 18 to electrically couple contacts 19, 20 and 21 with the battery 14 because of the connection between lead 13 and contact 19. This electrical connection of the contacts 19, 20 and 21 will result in the flow of current from lead 13 and contact 19 to contact 21 and thence through tongue 10 and contact 11, to the tongues 5 and 6 and to the solenoids 2 and 4. As both of these solenoids have grounded terminals, they will be simultaneously energized and their cores, which thus are actuated, will move the semaphores simultaneously into active or "stop" positions. If a left turn is to be made the driver operates the steering wheel as ordinarily. This will cause the cam 7 to turn in such a direction as to lift the tongue 6 connected to the solenoid of the left semaphore. As tongues 5 and 6 are constantly insulated from each other unless both are engaged by contact 11, it will be apparent that the lifting of tongue 6 will result in breaking the circuit from contact 11 to the right solenoid 2 with the result that this latter solenoid will be de-energized and its semaphore, which is the "right" semaphore, will drop to inactive position. As the circuit to the solenoid 4 is maintained through contact 11 and the lifted tongue 6, the left solenoid L will be maintained in signal-indicating or active position. Thus a person approaching the vehicle will be advised that said vehicle is making a "left" turn.

When the core 16 of the master solenoid was shifted, as explained, the disengaged arm 25 was moved back over the screw 29 and thereafter dropped into engagement with the screw, as has already been explained. Consequently simultaneously with the arrival of the arm at this point and the energizing of the solenoids, the core of the master solenoid 12 was placed in operative connection with the screw. Thus rotation of the screw by the action of the speedometer will result in gradually returning the core 16 to its initial position, it being understood of course, that the closing of the switch 15 which resulted in energizing the master solenoid, need only be momentary because thereafter current will be supplied to contact 21 from contact 19 as long as plate 18 engages both of these contacts.

As the solenoid travels toward its initial position under the action of the screw, the circuit to the solenoid 4 will be maintained as long as the car is turning and until plate 18 moves away from contact 21. At that instant the circuit to tongue 10 is broken and either semaphore which may have been shifted as a result either of a right hand or a left hand turn will drop to inactive position.

It is to be understood of course that if no turn is made when the brake switch is closed, both semaphores will be maintained in their raised positions to indicate that the vehicle is stopping.

Under some conditions it might be desirable to operate the semaphores without depending upon the turning of the wheels. For example, before the turn is begun the driver may desire to signal an approaching vehicle that a turn is about to be made. For this purpose it is necessary to utilize a control which is dependent upon the action of the driver rather than upon the turning of the vehicle wheels. One means for attaining this object has been shown in the drawings. It includes two electromagnets 34 and 35 both of which are grounded. Electromagnet 34 has an armature 36 positioned on the tongue 6 adjacent to the free end of said tongue and electromagnet 35 has a similarly located armature 37 on the tongue 5. The parts are so located that when electromagnet 34 is energized tongue 6 will be lifted thereby and when electromagnet 35 is energized tongue 5 will be lifted thereby. Obviously this will produce the same result in the actuation of the semaphores as would be obtained by lifting the tongues through the use of the cam 7. The electromagnets 34 and 35, however, are connected to separate contacts 36' and 37' forming two contact points of a three-way switch 38 which can be in the form of a small hand lever mounted on the steering post of the vehicle. This hand lever is electrically connected as at 39 to the lead 13 between battery 14 and switch 15 and a third contact 40 is electrically connected to the lead 13 at a point between switch 15 and the master solenoid 12.

Should it be desired to operate both semaphores simultaneously without applying the brakes, switch 38 can be shifted to contact 40 so that flow of current would be established from the battery 14 to master solenoid 12 and the solenoids of both semaphores would be simultaneously energized as before explained. Obviously, however, the same result could be obtained, as before, simply by closing the brake switch through the application of the brakes.

In any case, after the two semaphores have been shifted to "stop" positions, switch 38 can then be moved into engagement either with contact 36' or with contact 37'. If contact 36' is thus placed in circuit, electromagnet 34 is energized and tongue 6 is lifted by the utilization of armature 36. Consequently the circuit to solenoid 2 is broken and the right solenoid dropped leaving only the semaphore L in extended or active position. When switch 38 is moved to neutral position both semaphore solenoids will be out of circuit and the semaphores will be in inactive positions. Movement of switch 38 into engagement with contact 37' will result in actuation of the other semaphore to indicate a right turn.

By providing the tongue 24 the contact 11, when lifted by either of the tongues 5 and 6 when either of the magnets 34 and 35 is energized, will provide a means for supplying current from switch lever 38 through selected contacts 36 and 37 to tongue 24 and thence to the elevated tongue 5 or 6. This is due to the fact that when tongue 5 or 6 is shifted by its magnet the contact 11 will press tongue 24 against separate contacts 41 located at the input terminals of the respective electromagnets 34 and 35. Thus operation of the semaphores with or without the brake switch is properly effected.

What is claimed is:

1. The combination with a motor vehicle, of a direction signal including a signal indicator, an electromagnetic device for operating the same, a switch, and means controlled by the momentary closing of the switch for energizing said device, said means including a solenoid for a slidable core, a movable contact carried by the core, a fixed contact electrically joined to the electromagnetic device and normally spaced from the movable contact but positioned for engagement thereby when the core is shifted from normal position by the solenoid when energized, a core-returning feed screw, means operated by the movement of the motor vehicle for actuating said feed screw, and means for coupling the core to the feed screw when said core is brought to one extreme position by the energized solenoid.

2. The combination with a motor vehicle, of a direction signal including separate signal indicators, electromagnetic devices for operating the respective indicators, a switch, and means controlled by the momentary closing of the switch for simultaneously energizing said magnetic devices and simultaneously operating the indicators, said means including a master solenoid having a slidable core, a contact movable with the core, fixed contacts electrically joined to the respective electromagnetic devices and normally spaced from the movable contact, said fixed contacts being positioned for engagement by the movable contact when the core is shifted from normal position by the energized master solenoid, a vehicle-driven, core-returning feed screw, and means for coupling the core to the said screw when said core is brought to one extreme position by the energized master solenoid.

3. In a direction signal the combination with a motor vehicle and separate direction indicating means, of electrical means for actuating the same, said means including a solenoid having a movable core, means for energizing the solenoid, a rotatable feed screw, means actuated by the movement of the motor vehicle for driving the feed screw, a movable contact carried by the core and electrically connected to a source of current, a stationary contact normally spaced from but positioned for engagement by the movable contact, and means carried by the core for coupling said core to the feed screw when the core is actuated by the energized solenoid, said screw being rotatable to return the core to its initial position when coupled thereto.

4. In a direction signal the combination with a motor vehicle and separate direction indicating means thereon, of electrical means for actuating the same, said means including a solenoid having a movable core, means for energizing the solenoid, a feed screw, means actuated by the movement of the motor vehicle for driving the screw, a movable contact carried by the core and electrically connected to a source of current, a stationary contact normally spaced from but positioned for engagement by the movable contact, and means carried by the core for coupling said core to the feed screw when the core is actuated by the energized solenoid, said screw being rotatable to return the core to its initial position when coupled thereto, and means for uncoupling the core from the screw when the core is brought to its initial position.

5. In a direction signal the combination with a motor vehicle and separate direction indicating means thereon, of electrical means for actuating the same, said means including a solenoid having a movable core, means for energizing the solenoid, a feed screw, means operated by the movement of the motor vehicle for actuating the feed screw, a movable contact carried by the core and electrically connected to a source of current, a stationary contact normally spaced from but positioned for engagement by the movable contact, and means carried by the core for coupling said core to the feed screw when the core is actuated by the energized solenoid, said screw being rotatable to return the core to its initial position when coupled thereto, and means for uncoupling the core from the screw when the core is brought to its initial position, said means including a guide rod, an arm movably joined to the core and overlying the screw, said arm being knotted for up and down sliding movement relative to the core, levers supporting the rod, said core, when brought to one position by the energized solenoid, constituting means for engaging one of the levers and shifting it in one direction thereby to shift the guide rod and disengage it from the arm, the other lever being positioned for engagement by the core when brought to one position by the rotation of the engaged screw, thereby to lift the rod and disengage the arm from the screw.

CORNELIUS DUNHAM SCHURTER.

REFERENCES CITED

The following references are of record in the file of this patent:

UNITED STATES PATENTS

| Number | Name | Date |
| --- | --- | --- |
| 1,284,134 | Ogden | Nov. 5, 1918 |
| 1,530,641 | Bennett | Mar. 24, 1925 |
| 1,717,629 | Sawyer | June 18, 1929 |
| 2,009,693 | Heising | July 30, 1935 |
| 2,122,508 | Bell | July 5, 1938 |